April 21, 1925.
R. E. KLETT
COLORIMETER
Filed Jan. 6, 1921 2 Sheets-Sheet 1
1,535,070
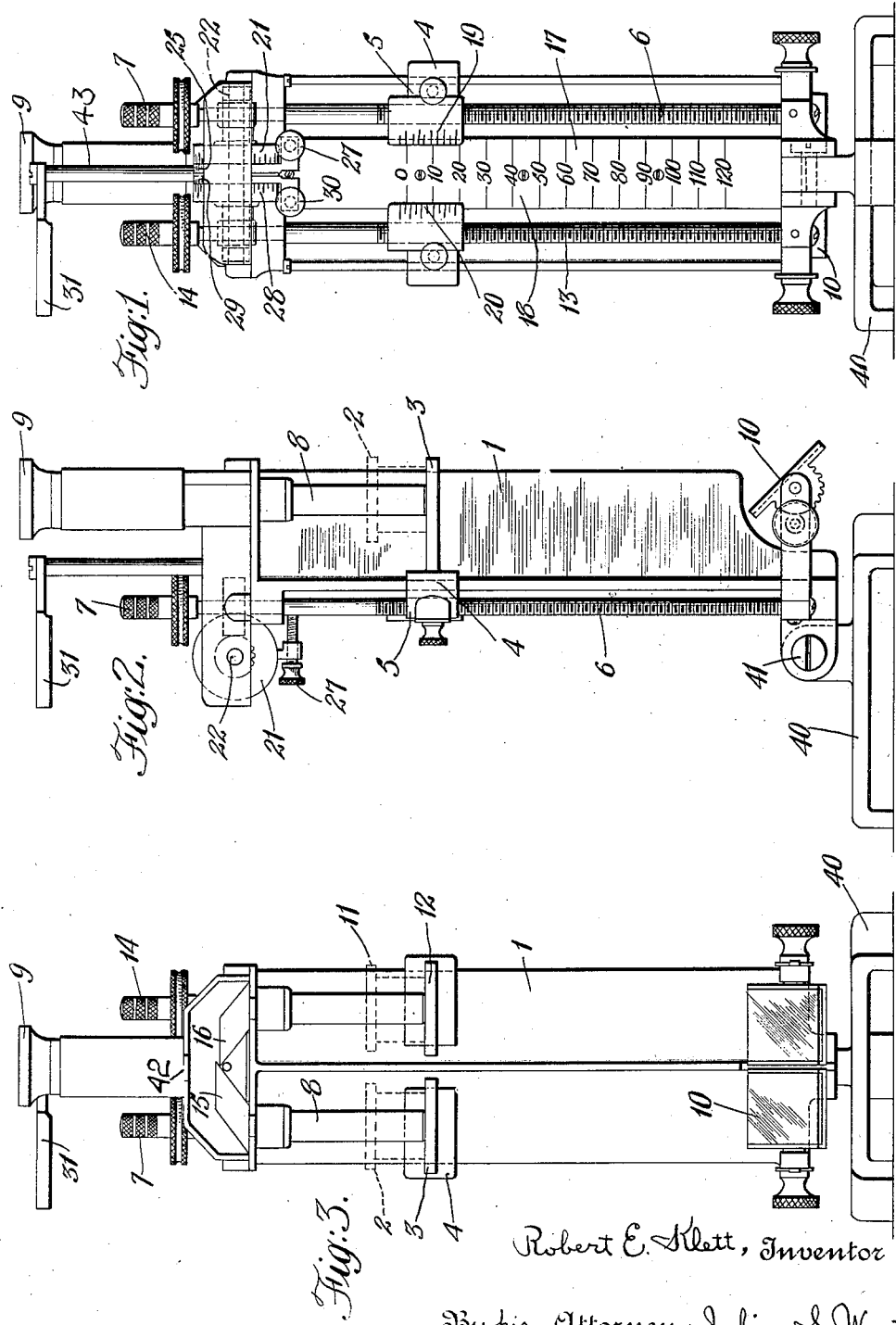

April 21, 1925.
R. E. KLETT
COLORIMETER
1,535,070
Filed Jan. 6, 1921
2 Sheets-Sheet 2
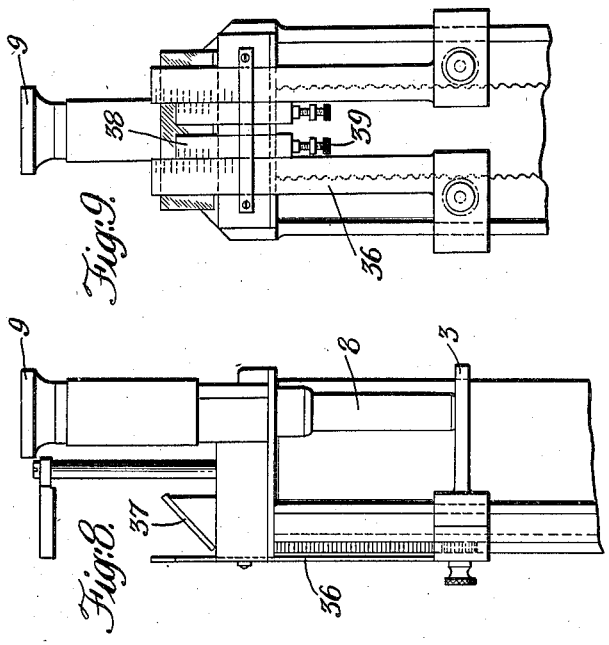
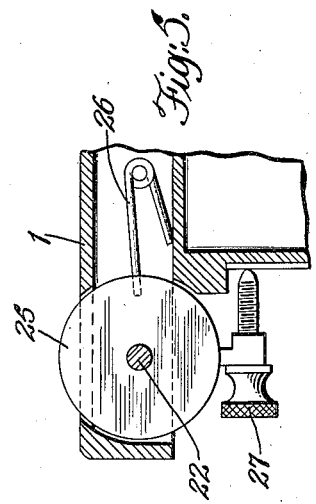
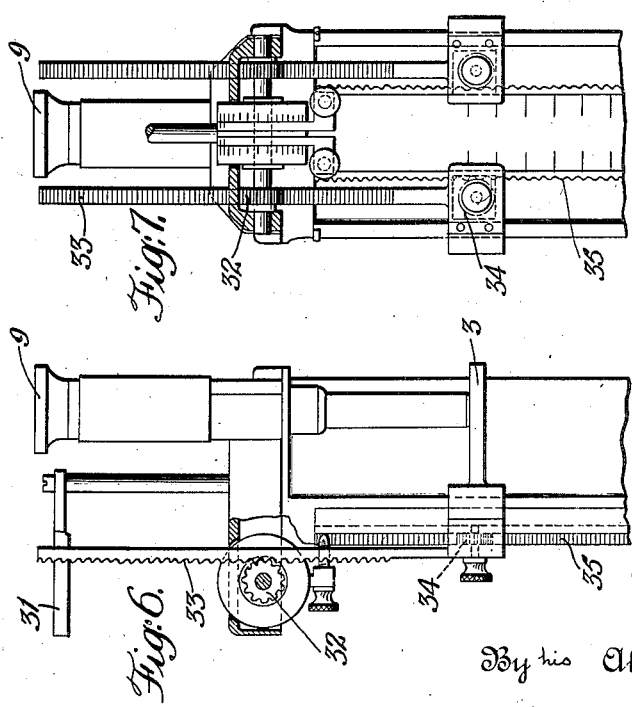
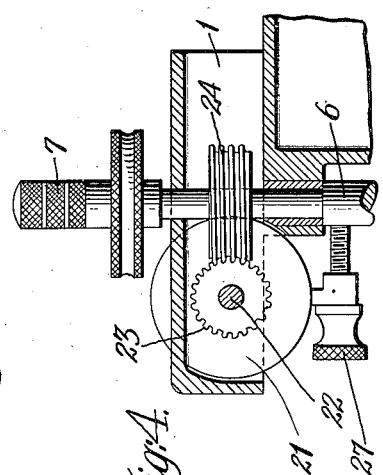
Robert E. Klett, Inventor
By his Attorney Julian S. Wooster Patented Apr. 21, 1925.

1,535,070

UNITED STATES PATENT OFFICE.

ROBERT E. KLETT, OF RIDGEFIELD PARK, NEW JERSEY, ASSIGNOR TO KLETT MANUFACTURING COMPANY, INC., OF NEW YORK, N. Y., A CORPORATION OF NEW YORK.

COLORIMETER.

Application filed January 6, 1921. Serial No. 435,318.

*To all whom it may concern:*

Be it known that I, ROBERT E. KLETT, a citizen of the United States, and resident of Ridgefield Park, in the county of Bergen and State of New Jersey, have invented certain new and useful Improvements in Colorimeters, of which the following is a specification.

This invention relates to colorimeters, and more particularly to an improved means for facilitating the scale reading of colorimeters. In practically all colorimeters now in use, comparison of test and standard solutions is effected by varying the depth or thickness of one of the solutions in relation to the other until the light rays traversing both are of the same color. The variation of layer thickness may be accomplished by relative movement of a cup and plunger, or by the movement of a wedge shaped container. In either case the movement is substantially vertical, and has hitherto been registered upon a vertical scale. In the more convenient type of instruments, the eye piece for observing the color solutions has its axis either vertical or slightly inclined from the vertical, so that the observer may look down into it. Hence, after making his setting for equal color, the observer must shift his glance from the horizontal field of the eye piece to the vertical scale in order to obtain his reading. As horizontal light rays are generally employed, and the scale, being on the side of the instrument facing the observer, is always in the shadow, readings must be made against the full glare of the light source. Furthermore, the change in direction from looking down into the eye piece to looking sidewise at the scale is awkward, and the change in visual focus from the image of the diaphragm in the eye piece to the scale after repeated observations has been found extremely fatiguing.

These disadvantages I have overcome by placing the diaphragm and the scale in adjacent fields of vision. Two eye pieces are employed, one for the diaphragm and the other for the scale. These eye pieces are placed side by side and are chosen of such focal lengths with respect to the positions of the scale and the diaphragm that the same will both appear equally remote from the eye of the observer. The two eye pieces will thus afford adjacent fields of vision, and no change of focus in the eye will be required. For both observations, the glance will be directed downward, or at a slight inclination from the vertical, thus permitting the observer to assume a more convenient attitude and avoiding the glare of the light source in reading the scale, as well as avoiding the visual fatigue due to repeated changes of focus.

With these and other objects, as will presently appear, I have devised the apparatus disclosed in the following description and in the accompanying drawings, of which—

Figure 1 is a front elevation of an apparatus, embodying the preferred form of the invention, Figure 2 is a side elevation of the apparatus shown in Figure 1, Figure 3 is a rear elevation of the apparatus shown in Figure 1, Figure 4 is a view partly in section showing the scale and scale actuating mechanism, Figure 5 is a detail view of the vernier adjusting means, Figure 6 is a side elevation of a modified form of apparatus embodying the invention, Figure 7 is a front elevation of the apparatus shown in Figure 6, Figure 8 is a side elevation of a further modification, and Figure 9 is a front elevation of the apparatus shown in Figure 8.

1 designates a frame, which may be forged integral or built up of separate parts riveted or otherwise suitably secured together. 2 is a container for the solution to be tested, 3 a stage for holding the container, 4 a slide or guideway for the stage, preferably integral with frame 1. 5 is an internally threaded block or nut secured to or integral with said stage 3. 6 is a threaded rod rotatably mounted in the frame, and having a knurled adjusting head 7 whereby stage 3 may be raised or lowered. 8 is a fixed plunger secured to frame 1 and having a flat transparent bottom, 9 is an eye piece for the color observing means, and 10 an adjustable mirror for intercepting and reflecting the horizontal rays from the light source up through the solution. A similar container 11 is provided for the standard solution and likewise a stage 12, and similar means for raising and lowering the same, including a threaded rod 13 with knurled head 14. The light rays which respectively traverse the two solutions are brought adjacent one another in the field of eye piece 9, defined by the usual diaphragm, by a pair of double reflecting prisms 15 and 16, well known in the art, and which need not be described further. A diaphragm 42 defines the field of vision, shutting out extraneous light and affording a convenient object for focusing eye piece 9 thereupon.

The amount of color absorbed will be directly proportional to the depth of solution; hence the intensity of the color of the ray transmitted will vary inversely as the depth or layer thickness of solution, and the measurement of such depths or thicknesses constitutes the means for indicating or comparing the color intensities of the solutions. Such measurement is effected by observing the position of the movable stages upon scales.

The vertical scales 17 and 18 for stages 3 and 12 respectively, together with verniers 19 and 20 secured to the respective stages may, if desired, be furnished with the instrument, but do not form part of the present invention.

In the preferred form of the invention, as shown in Figure 1, the depth or layer thickness of liquid in container 2 is determined by a scale 21 in the form of a cylinder having graduations disposed on its periphery, and mounted on a horizontal shaft 22 carried in suitable bearings in frame 1. On the same shaft with scale 21, and preferably integral with same, is a worm wheel 23, actuated by a worm 24 on rod 6. The respective pitches of worm wheel 23 and worm 24 and the diameter of the scale cylinder 21, may be so chosen as to provide such spacing for the scale graduation as may be desirable. In the preferred form of the invention, they are so proportioned that the linear travel of the periphery of scale cylinder 21 will be equal to the displacement of stage 3, so that the graduations will be the same as on scale 17 and thus constitute a means for reading scale 17 from above. Rotatably mounted on shaft 22, adjacent scale 21 and of the same diameter, is a cylindrical vernier 25. Vernier 25 is held from rotation by a spring 26 integral therewith and engaging frame 1, and by a tangent screw 27 which is held against the frame or a rigid portion of the instrument by the force of spring 26. Screw 27 permits a slight movement of the vernier to adjust zero reading to a corresponding setting of the stage. In like manner, rod 13 actuates a similar scale 28 for determining the position of stage 12, and scale 28 has a vernier 29 and vernier adjusting screw 30 similar in all respects to those previously described.

The two scales 21 and 28 with their respective verniers are disposed adjacent one another on shaft 22. An eye piece 31 which may consist of a simple convex lens, is placed adjacent eye piece 9 and over scales 21 and 28, and is chosen of such focal length that the fields of vision of the two eye pieces, will be equally distant from the eye of the observer.

In the modification shown in Figures 6 and 7, an ordinary spur gear wheel 32 is substituted for the worm wheel 23, and a rack 33 meshing therewith and fixed to the stage 3, is substituted for worm 24. A pinion 34 secured to stage 3, and rack 35 fixed to the frame 1 may be substituted for threaded rod 6 and nut 5 for adjusting stage 3. The adjusting and indicating means for stage 12 are in all respects similar to the foregoing and need not be further described.

A further modification is shown in Figures 8 and 9, in which the cylindrical scale is dispensed with and a straight scale or indicator 36 carried between suitable guides, is movable with stage 3. A 45° mirror 37 provides means for reading the scale from above and enables the scale to be read through eye piece 31, the graduations being reversed on the scale so as to read directly after reflexion. A straight vernier 38 adjacent scale 36 is carried in a suitable guide in frame 1, and is provided with an adjustment screw 39. The scale and vernier for stage 12 are similar in all respects to the foregoing, and need not be described. Both scales, with their respective verniers, are located adjacent each other, and are both observable in mirror 37 through eye piece 31.

A heavy base 40 is provided for the instrument, and the frame 1 may be clamped thereto by a bolt 41 through a lug on base 40 included in the space between two separated lugs on frame 1. This permits the instrument to be tilted at any desirable inclination.

The invention here set forth as embodied in a plunger colorimeter is equally suitable for use in colorimeters of the wedge type and in nephelometers, and is not intended to be limited to the particular design of instrument described.

Eye piece 31 is pivotally mounted on shaft 43 in such a manner that when not in use it may be swung around to more convenient position. If desirable, a guard may be provided to cover both eye pieces 9 and 31 when such disposition has been made of the latter. The color observing means and the color intensity indicating means are both on top of the colorimeter where they are fixed with respect to the same and with respect to each other, and it will be seen from the drawing that the direction of vision of the observer looking at either of said means is substantially parallel with the line of vision in looking at the other means.

This enables the color observing means and both scales of the color intensity indicating means to be viewed without having the operator turn his head any substantial amount.

What I claim is:

1. A colorimeter comprising containers for test and standard solutions, means movable upwardly and downwardly for adjusting the depths of said solutions, color observing means for each of the solutions, color intensity indicators for these solutions located close together and near the color observing means, and means adjacent said color observing means for reading said indicators in the same direction from over the colorimeter as in using the color observing means.

2. A colorimeter comprising color observing means, color intensity indicating means comprising members movable upwardly and downwardly, indicators located close together in the upper portion of the colorimeter and actuated by said members, and means adjacent the color observing means for reading said indicators from a position over the colorimeter in a downward direction as in using the color observing means.

3. In a colorimeter, the combination with a plurality of liquid containers, of means for directing light rays therethrough, means for observing the colors by light rays passing through the liquid of the containers from a position over the colorimeter, means for varying the depths of liquids traversed by light rays entering said color observing means, comparison indicators for the relative depths of said liquids, said indicators being located closer adjacent each other than the axes of said containers, above the central portion of the colorimeter, adjacent said color observing means, and arranged to be readable from above the colorimeter in a downward direction substantially parallel to the optical axis of the instrument and from a position close beside said color observing means.

4. A colorimeter comprising containers for test and standard solutions, means movable upwardly and downwardly for adjusting the depths of said solutions, color observing means for each of the solutions, color intensity indicators for these solutions located in the upper portion of the colorimeter, and means adjacent said color observing means for reading said indicators together and over the colorimeter in the same direction from over the colorimeter as in using the color observing means.

5. A colorimeter comprising color observing means, color intensity indicators located above the central portion of the colorimeter, and means for reading both of the indicators from above the colorimeter with substantially the same focus of the operator's eye during continued readings.

6. In a colorimeter, the combination with color observing means including an eye piece, of color intensity indicating means, an eye piece for said color intensity indicating means, each of said eye pieces being provided with a lens for observing both of said means in a downward direction.

7. In a colorimeter, a container for test solution, means for causing a light ray to traverse said solution, means including an eye piece for observing the color of said light ray, means for varying the length of solution so traversed, means actuated thereby, including a scale, for indicating said length of solution, and a second eye piece adjacent the first named eye piece, said indicating means being so disposed as to be observable in said second eye piece.

8. In a colorimeter, a container for test solution, a movable stage for securing color adjustment, a color observing eye piece, means for adjusting said stage, a cylinder having peripheral graduations, rotatable with the operation of last said means to indicate the amount of said adjustment, a vernier for said graduated cylinder, and a second eye piece adjacent to first said eye piece, the said graduated cylinder and vernier being so disposed as to be observable in second said eye piece.

9. In a colorimeter, a container for test solution, a movable stage for securing color adjustment, a color observing eye piece, means for adjusting said stage, a cylinder having peripheral graduations, rotatable with the operation of last said means to indicate the amount of said adjustment, a vernier for said graduated cylinder, and a second eye piece adjacent to first said eye piece for observing the graduations on said cylinder and vernier.

10. In a colorimeter, a container for a solution, means for passing a light ray through said solution, means for moving said container to vary the length of solution traversed by said light ray, an eye piece for receiving the ray passing through said solution, said eye piece being disposed in the direction of movement of the container, color intensity indicating means, and a second eye piece for said color intensity indicating means located adjacent the first eye piece, said eye pieces being of such respective focal lengths as to afford adjacent fields of vision.

11. The combination with a color observing means, of a color intensity indicating means having a substantially vertical scale, another scale in the upper end portion of said colorimeter and located at an angle to said vertical scale, and means interconnecting said scales adapted to produce simultaneous indications on each.

12. In a colorimeter, a container for a solution, means for causing a light ray to traverse said solution, means for observing the color of the light ray as modified by its passage through the solution, means for varying the length of solution so traversed, a threaded rod for actuating said last means, a worm on said rod, a rotatably mounted cylindrical scale, and a worm wheel meshing with said worm and attached to said scale for rotating the latter.

13. In a colorimeter, a container for a solution, means for causing a light ray to traverse said solution, means for observing the color of said light ray as modified by its passage through the solution, means for varying the length of solution so traversed, a rack movable with last said means, a rotatably mounted cylindrical scale, and a pinion meshing with said rack and attached to said scale for rotating the latter.

14. In a colorimeter, the combination with a color observing means, of a color intensity indicating means, both means being located adjacent one another in the upper end portion of said colorimeter and adapted to be viewed in substantially the same direction, a container through which light rays are passed to said color observing means, and a second color intensity indicating means located substantially parallel with the light rays passing through said container.

15. In a colorimeter, means, including an eye piece, for observing the color of a solution, means for varying the thickness of said solution, means adjacent said eye piece, including a scale and a second eye piece positioned thereover for indicating the thickness of solution so observed, and a pivotal mount for said second eye piece whereby the latter may be moved into more convenient position when not in use.

16. In a colorimeter, a frame, a container for test solution, means for causing a light ray to traverse said solution, means for observing the color of said light ray, means for varying the length of solution so traversed, a cylindrical scale rotatable with the movement of last said means, a cylindrical vernier rotatably mounted in alignment with and adjacent to said scale, a spring tending to rotate said vernier, and a tangent screw threaded in the vernier and bearing against said frame in opposition to the force of said spring, for adjusting said vernier.

17. A colorimeter comprising two eye pieces having adjacent fields of vision, means for comparing the colors of two solutions in one of said eye pieces, means for varying the relative depths of said solutions to secure equal intensity of color, and means for indicating in the other eye piece the relative depths of said solutions.

18. A colorimeter comprising two fixed eye pieces having adjacent fields of vision, means for comparing the colors of two solutions in one of said eye pieces, means for varying the relative depths of said solutions to secure equal intensity of color, and means for indicating in the other eye piece the relative depths of said solutions.

19. A colorimeter comprising two downwardly directed eye pieces having adjacent fields of vision, means for comparing the colors of two solutions in one of said eye pieces, means for varying the relative depths of said solutions to secure equal intensity of color, and means for indicating in the other eye piece the relative depths of said solutions.

20. In a colorimeter, a container for a solution, a color observing eye piece, means for passing a light ray through said solution into said eye piece, means for effecting relative movement between said eye piece and said container to vary the length of solution traversed by said light ray, and a rotatable scale actuated by last said means for measuring the length of solution so traversed.

Signed at New York city, in the county of New York and State of New York this 4th day of January, A. D. 1921.

ROBERT E. KLETT.